US010460212B1

United States Patent
Charlton et al.

(10) Patent No.: US 10,460,212 B1
(45) Date of Patent: Oct. 29, 2019

(54) BINNING DIGITAL IMAGES BY SOURCE CAMERA

(71) Applicant: The Government of the United States as represented by the Director, National Security Agency, Ft. George G. Meade, MD (US)

(72) Inventors: Sarah T. Charlton, Frederick, MD (US); John A. Emanuello, Odenton, MD (US)

(73) Assignee: U.S. Government as represented by the Director, National Security Agency, Washington, DC (US)

( * ) Notice: Subject to any disclaimer, the term of this patent is extended or adjusted under 35 U.S.C. 154(b) by 94 days.

(21) Appl. No.: 15/792,456

(22) Filed: Oct. 24, 2017

(51) Int. Cl.
*G06K 9/00* (2006.01)
*G06K 9/62* (2006.01)

(52) U.S. Cl.
CPC .................................. *G06K 9/6267* (2013.01)

(58) Field of Classification Search
None
See application file for complete search history.

(56) References Cited

U.S. PATENT DOCUMENTS 9,525,866 B1 * 12/2016 Charlton .............. H04N 17/004
9,892,538 B1 * 2/2018 Balasubramanian ... G06T 11/60

OTHER PUBLICATIONS

Fast Image Clustering of Unknown Source Images, Roberto Caldelli et. al., Media Integration and Communication center, Uni. of Florence, Italy (Year: 2010).*
Caldelli (NPL: Fast I mage Clustering of unknown Source Images, Media Integration and Communication Center—MICC, University of Florence., 2010) (Year: 2010).*
Caldelli, Roberto, et al.; Fast Image Clustering of Unknown Source Images; Published in Information Forensics and Security (WIFS) 2010 IEEE International Workshop on Dec. 12-15; Seattle, WA, USA; available at https://www.researchgate.net/publication/224218276.
Fridrich, Jessica; Digital Image Forensics Using Sensor Noise; IEEE Signal Processing Magazine; 2009; Issue 26.2, pp. 26-37; available at www.ws.binghampton.edu/fridrich/Research/full_paper_02.pdf.
Eklann, Josef, et al.; Source Camera Classification and Clustering from Sensor Pattern Noise; Chalmers University of Technology, 2012; available at http://publications.lib.Chalmers.se/records/fulltext/163351.pdf.
Charlton et al.; Method of Comparing a Camera Fingerprint and a Query Fingerprint; U.S. Appl. No. 15/279,928, filed Sep. 29, 2016.

* cited by examiner

*Primary Examiner* — Iman K Kholderbarin

(57) ABSTRACT

A method is disclosed for using digital camera fingerprints to create bins of digital images generated by the same digital camera. The method includes determining, for each digital image in the set of digital images, a digital fingerprint. The method also includes sorting each digital image into one of a high-quality subset and a low-quality subset. The method also includes sorting each digital image in the high-quality subset into one of a plurality of bins. In each bin the images were determined, based on the digital fingerprints of the images in the bin, to have been generated by a single digital camera associated with the bin. The method also includes sorting each digital image in the low-quality subset into one of the plurality of bins, the sorting being performed based on the digital fingerprint of the digital image.

20 Claims, 4 Drawing Sheets

BINNING DIGITAL IMAGES BY SOURCE CAMERA

FIELD OF INVENTION

The present invention relates, in general, to image processing, and in particular, to binning digital images using digital camera fingerprints.

BACKGROUND OF THE INVENTION

Camera fingerprinting is a process for linking a particular image to the exact camera from which it was taken. This process, which is used in, for example, forensics applications, has been compared to gun identification from bullet scratches. In classical film photography, there are methods for camera identification used in forensic science. Some of these methods use camera imperfections, such as scratches on the negative caused by the film transport mechanism.

It also is possible to perform camera fingerprinting using a noise pattern for a sensor in a digital camera. Digital cameras capture light with either a charge-coupled device (CCD) or complementary metal-oxide semiconductor (CMOS). Both are made of grids of light detectors, i.e., pixels. Natural variations in the size and consistency of the pixels on the image sensor occur as part of the manufacturing process. These slight imperfections on the image sensor impart a noise pattern on the image that can be extracted and analyzed. The noise pattern is called the photo response non-uniformity (PRNU). Camera fingerprints have been determined using the PRNU from images captured by a digital camera.

SUMMARY

A first embodiment of the present invention is a computer-implemented method of using digital camera fingerprints to create, in a set of digital images generated by a plurality of digital cameras, bins of digital images. Each digital image in a particular bin was generated by the same digital camera as every other digital image in the same bin. The method includes determining, for each digital image in the set of digital images, a digital fingerprint. The method also includes sorting each digital image into one of a high-quality subset and a low-quality subset. The method also includes sorting each digital image in the high-quality subset into one of a plurality of bins. In each bin the images were determined, based on the digital fingerprints of the images in the bin, to have been generated by a single digital camera associated with the bin. The method also includes sorting each digital image in the low-quality subset into one of the plurality of bins, the sorting being performed based on the digital fingerprint of the digital image.

In a related embodiment, sorting digital images into bins also includes iteratively calculating aggregate digital fingerprints associated with the bins by combining digital fingerprints associated with the images already in the bins and digital fingerprints associated with the images being sorted into the bins. Sorting digital images into bins is performed based also on the aggregate digital fingerprints associated with the bins.

In another related embodiment, each digital image comprises pixels, and sorting each digital image into one of a high-quality subset and a low-quality subset includes, for each digital image, calculating an extreme pixel factor by 1) determining a first number of pixels in the digital image having a pixel intensity greater than a brightness threshold, 2) determining a second number of pixels in the digital image having a pixel intensity less than a darkness threshold, 3) determining a third number of extreme pixels by adding the first number of pixels and the second number of pixels, and determining the extreme pixel factor by dividing the third number of extreme pixels by a total number of pixels in the digital image. The method also includes sorting the digital image into one of the high-quality subset and the low-quality subset based on the extreme pixel factor and a pixel factor threshold.

In a further related embodiment, the brightness threshold is at least 250 and the darkness threshold is at most 60. The pixel factor threshold may be 0.2. In another embodiment, the pixel factor threshold may be 0.5. Sorting each digital image into one of a high-quality subset and a low-quality subset may further include ordering the digital images in the high-quality subset and the low-quality subset according to the extreme pixel factor, such that both a) sorting each digital image in the high-quality subset and b) sorting each digital image in the low-quality subset are performed by processing the digital images in an order according to the extreme pixel factor.

Another embodiment of the present invention is a computer-implemented method of using digital camera fingerprints to create, in a set of digital images generated by a plurality of digital cameras, bins of digital images. Each digital image in a particular bin was generated by the same digital camera as every other digital image in the same bin. The method includes determining, for each digital image in the set of digital images, a digital fingerprint. The method also includes performing a presort operation to divide the set of digital images into presort sets. The method also includes, for each presort set, sorting each digital image in the presort set into one of a high-quality subset and a low-quality subset. The method also includes, for each high-quality subset in a presort set, sorting each digital image in the high-quality subset into one of a plurality of bins associated with the presort subset. In each bin the images were determined, based on the digital fingerprints of the images in the bin, to have been generated by a single digital camera associated with the bin. The method also includes, for each low-quality subset, sorting each digital image in the low-quality subset into one of the plurality of bins associated with the presort subset, the sorting being performed based on the digital fingerprint of the digital image. The method also includes performing a merge operation to combine the pluralities of bins associated with the presort sets into a single plurality of bins associated with the set of digital images. Each bin of the single plurality of bins contains only digital images determined to have been generated by a single digital camera associated with the bin.

In a related embodiment, the presort operation includes sorting based on dimensions of the digital images. In another related embodiment, the presort operation includes sorting based on EXIF information of the digital images.

Another embodiment of the present invention is a computer-readable medium having computer processor-executable instructions stored thereon. Execution of the instructions by a computer processor causes the computer processor to perform a method of creating, in a set of digital images generated by a plurality of digital cameras, bins of digital images. The method includes determining, for each digital image in the set of digital images, a digital fingerprint. The method also includes performing a presort operation to divide the set of digital images into presort sets. The method also includes, for each presort set, sorting each digital image in the presort set into one of a high-quality subset and a low-quality subset. The method also includes, for each high-quality subset in a presort set, sorting each digital image in the high-quality subset into one of a plurality of bins associated with the presort subset. In each bin the images were determined, based on the digital fingerprints of the images in the bin, to have been generated by a single digital camera associated with the bin. The method also includes, for each low-quality subset, sorting each digital image in the low-quality subset into one of the plurality of bins associated with the presort subset, the sorting being performed based on the digital fingerprint of the digital image. The method also includes performing a merge operation to combine the pluralities of bins associated with the presort sets into a single plurality of bins associated with the set of digital images. Each bin of the single plurality of bins contains only digital images determined to have been generated by a single digital camera associated with the bin.

DETAILED DESCRIPTION

A pixel image output by a digital camera may be represented as a matrix I of real numbers. All such images will contain a certain amount of noise from a variety of sources, such as shot noise, read-out noise, quantization distortion, and dark current. One type of noise that is of particular interest is photo response non-uniformity (PRNU). The total noise of an image may be modeled as $I=I_{true}+W$, where $I_{true}$ represents the light intensity of the image without any added noise or imperfections, and W accounts for all types of noise. The noise W, in turn, can be modeled as $W=I_{true}*K+X$, where K represents the distortion of I due to PRNU and X accounts for all other noise in the image other than what can be ascribed to PRNU. In determining digital camera fingerprints, it is generally sufficient to assume X to be Gaussian white noise with mean zero and fixed variance, where X is independent of $I_{true}*K$. A maximum likelihood estimator for K over N images from a single camera can be calculated as $$\hat{K} = \frac{\sum_{k=1}^{N} W_k I_k}{\sum_{k=1}^{N} I_k^2}$$

(EQN. 1)

Figure 1:
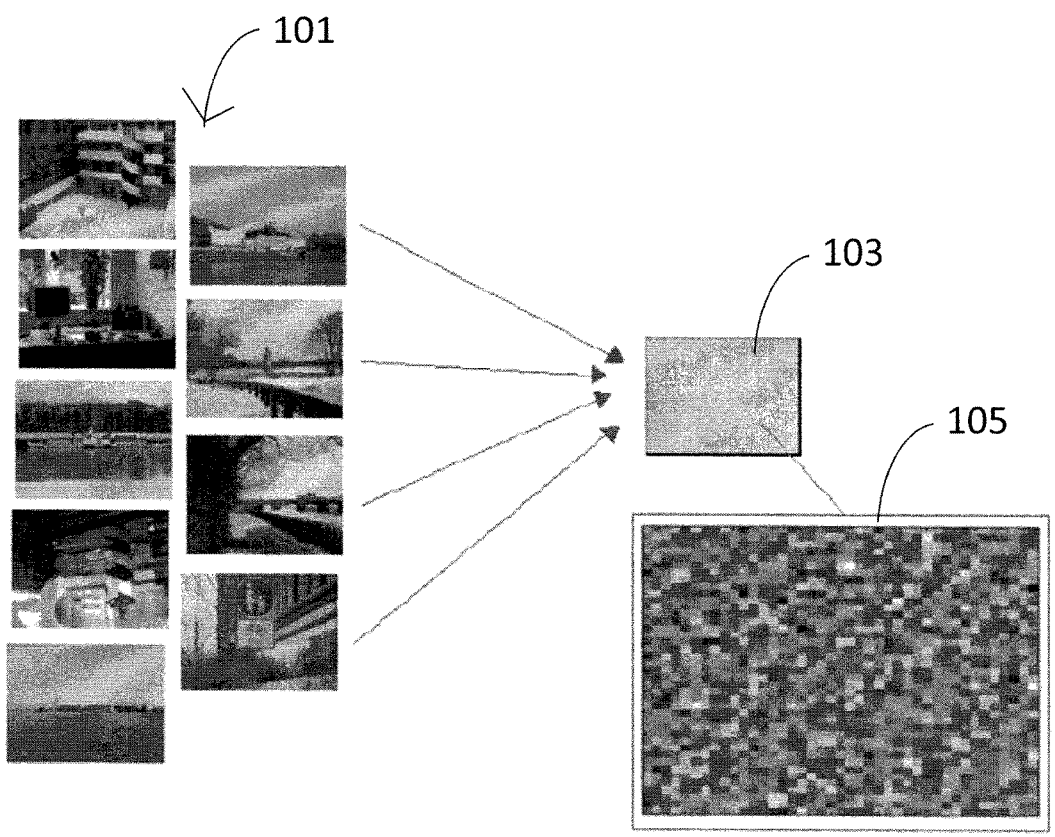
FIG. 1 is a diagram illustrating a digital camera fingerprint.

The conceptual basis of this equation can be seen with reference to FIG. 1, which is a diagram illustrating a digital camera fingerprint. A collection of digital images 101 which are known to have been generated by the same digital camera are processed to create a single characteristic noise pattern 103 (enlarged to show detail at element 105), which is referred to as the fingerprint of the digital camera that generated the images 101.

The estimation of K in EQN. 1 may in some cases be calculated separately for each color channel of the images being analyzed (e.g., red, green, and blue). In some cases, the complete images containing all color channels may instead be treated as grayscale image data and processed accordingly to calculate a digital camera fingerprint representing the unique K of the digital camera. In other cases, it may suffice to consider only a single color channel, and the other color channels may be disregarded in calculating the fingerprint. As shown in FIG. 1, a number of digital images 101 may be known to have originated from a single camera. Those images may then be used to generate a digital camera fingerprint 103. Element 105 shows the digital camera fingerprint 103 enlarged to illustrate more clearly how an exemplary fingerprint might appear, if it were converted into image data.

A commonly used statistic to determine whether two images were generated by the same camera is the PCE, or peak-to-correlation energy, which is a measure of the peak correlation over the noise floor. The PCE is defined by:

$$PCE = \frac{\rho(s_{peak}; K_1, K_2)^2}{\frac{1}{mn-1} \sum_{s \neq s_{peak}} \rho(s; K_1, K_2)^2}$$

whose numerator is the square of the maximum of the normalized cross correlation of two fingerprints K1 and K2:

$$\rho(s_{peak}; K_1, K_2) = \max_{s=(s_1,s_2)} \rho(s_1, s_2; K_1, K_2)$$

where $$\rho(s_1, s_2; K_1, K_2) = \frac{\sum_{k=1}^{m} \sum_{l=1}^{n} (K_1[k,l] - \overline{K_1})(K_2[k+s_1, l+s_2] - \overline{K_2})}{\|K_1 - \overline{K_1} \cdot 1\| \|K_2 - \overline{K_2} \cdot 1\|}$$

and $(s_1, s_2)$ are the coordinates of a circular shift, $\overline{K}$ is the mean of the entries of K, 1 denotes the matrix of ones, and $\|*\|$ denotes the $L_2$ norm.

When the PCE is above a certain threshold τ, then we have strong evidence that the fingerprints match. Conversely, if the PCE is not above the threshold we cannot conclude a match. Empirical evidence has determined τ=60 to be a reasonable threshold.

Figure 2:
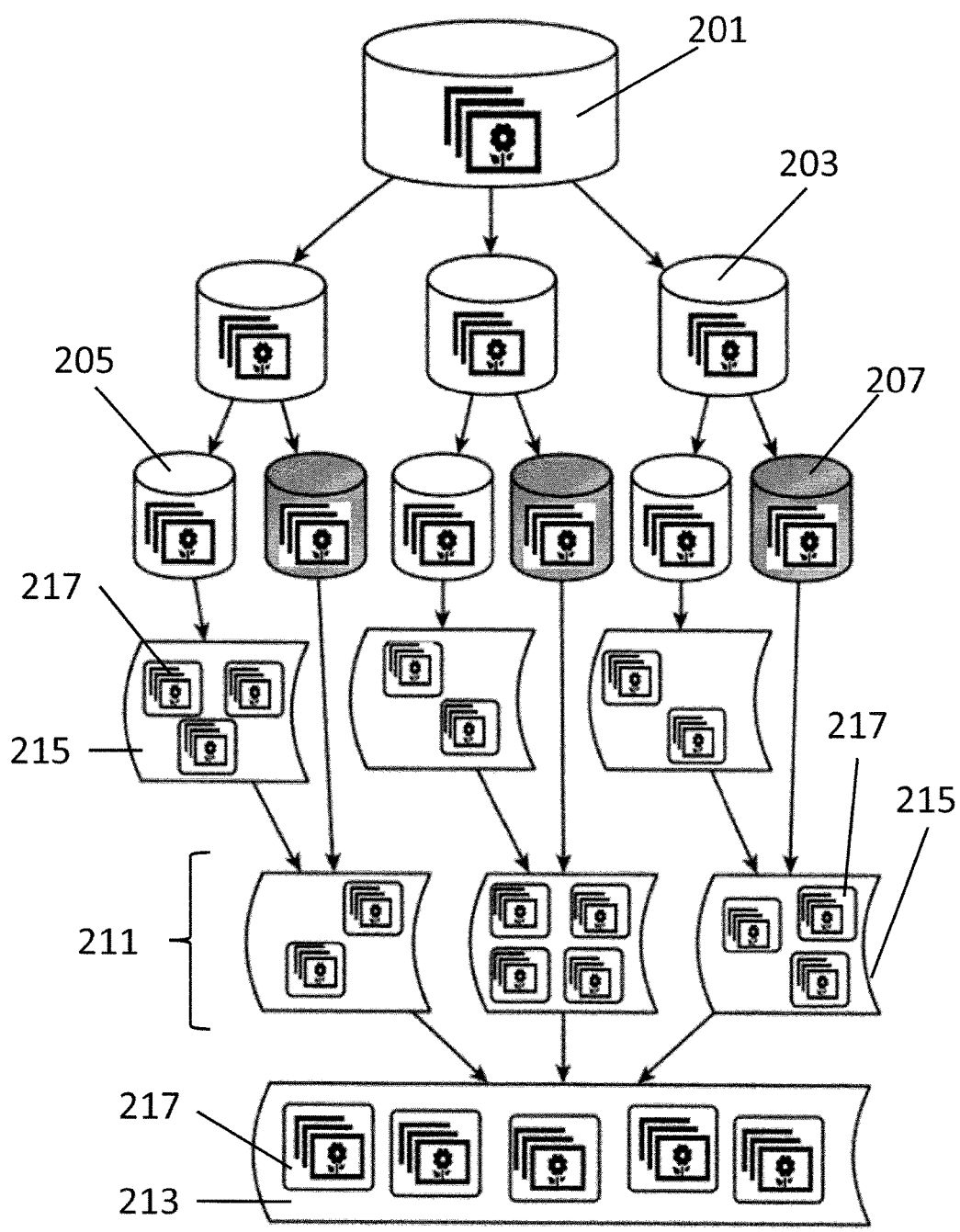
FIG. 2 is a diagram illustrating a data flow in a process in accordance with an embodiment of the present invention.

A data flow in a process in accordance with an embodiment of the present invention is now described with reference to FIG. 2. The data flow begins with a set of digital images 201, each of which will have an associated digital fingerprint. The set of digital images can be presorted into one or more presort sets 203 according to dimension, EXIF data, or other metadata or image content that may be available. Each of the presort sets 203 is further divided into two subsets: a "good" (i.e., high-quality images) subset 205 and a "bad" (i.e., low-quality images) subset 207, based on a quality metric. The quality metric reflects an expected likelihood of success in matching an image with another image as being from the same camera, based on the digital fingerprints of the two images. This quality metric will also be referred to in terms of good/high quality images vs. bad/low quality images. Each of the high-quality subsets 205 is then processed to sort the digital images in the high-quality subset 205 into one or more camera bins 217. Each high-quality subset 205 will thus have an associated set 215 of camera bins 217, each containing images from the associated high-quality subset 205. The digital images in each of the low-quality subsets 207 are then sorted into camera bins 217 in the associated set 215 of camera bins 217. The superset 211 of sets 215 of camera bins 217 is then merged to form a single set 213 of camera bins 217.

Figure 3:
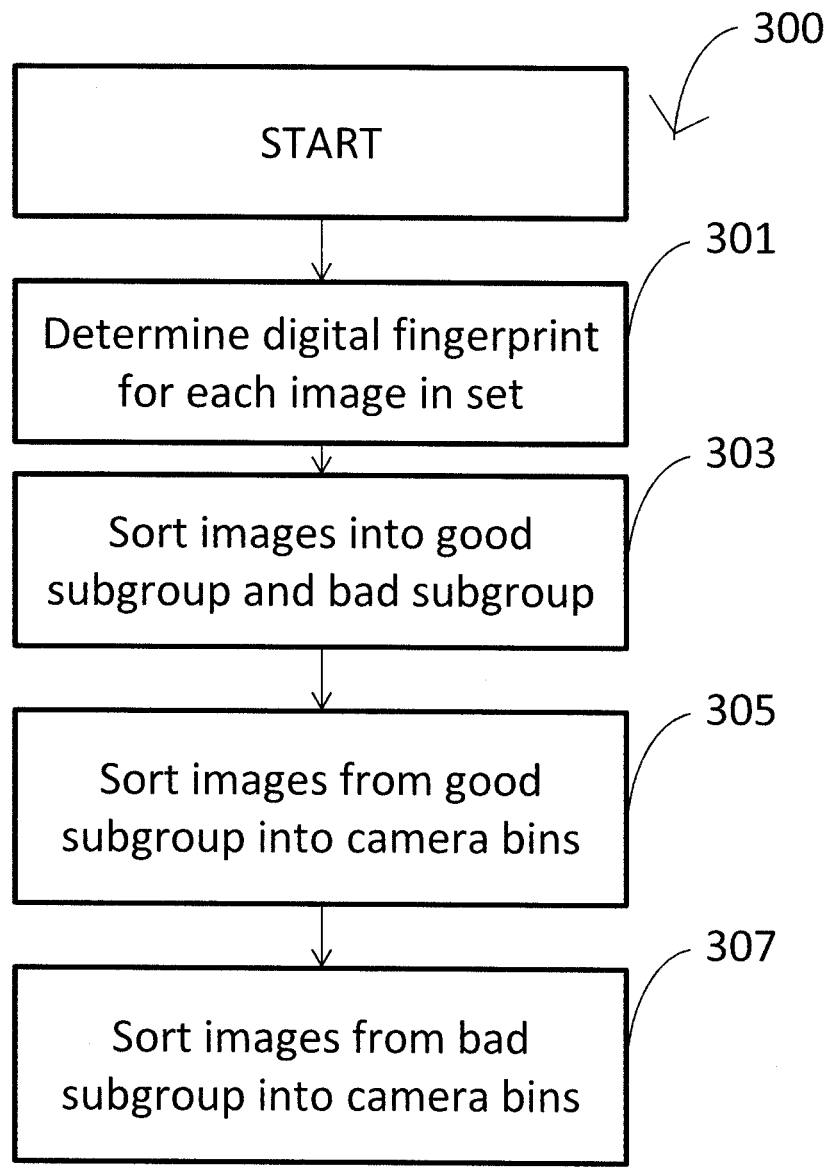
FIG. 3 is a flow chart describing a process for creating bins of digital images in accordance with an embodiment of the present invention.

A process 300 in accordance with an embodiment of the present invention is now described with reference to FIG. 3. The process 300 begins at block 301, where a digital fingerprint is determined for each image in a set of digital images. The digital fingerprints may be, for example, the PRNUs. The fingerprints may be determined according to methods known in the art, such as by applying a denoising filter to an image and subtracting the result from the original image. In other applications of digital camera fingerprinting, a fingerprint is often built up by combining results from multiple images known to come from a single camera. In the present case, however, the expectation is that all digital images in the set are of unknown provenance. Accordingly, we must begin by building a collection of fingerprints that have fingerprint mass=1, i.e., only one image was used in forming the fingerprint. In the event that more information is available, the processes described herein can be modified for improved accuracy in accordance with techniques known in the art.

The process continues at block 303, where the images are sorted into a high-quality subset and a low-quality subset. This is done by evaluating each image according to a quality metric. Some images are better suited for accurate source camera identification than others. In particular, images that are either saturated or under-exposed tend not to work well in comparative image analysis using PCEs. One quality metric that can be used is an extreme pixel factor (EPF), which may be calculated by counting a number of pixels in an image for which the image data have either very light or very dark values. In one example, very light may be defined as a brightness value of at least 250 (on a scale of 0-255, as with 8-bit brightness values), while very dark may be defined as a brightness value of at most 60. The EPF also may be normalized by dividing the sum of the very light and very dark pixels by the total number of pixels in the image, thereby allowing the EPF to be compared more meaningfully against other images having a different number of pixels. According to one embodiment, a threshold value may be defined, such that an EPF exceeding this threshold causes the image to be sorted into the low-quality subset, while an EPF below this threshold causes the image to be sorted into the high-quality subset. The inventors have observed that an EPF less than 0.2 for both images in a pair of images is associated with high PCE scores, while EPFs of greater than 0.5 are associated with drastically lower PCE scores. The threshold value may be chosen as 0.2, 0.5, or some other appropriate value, based on the demands of a particular application.

The process continues at block 305, where the images in the high-quality subset are sorted into camera bins. Because every image in the high-quality subset has a low EPF, there is an increased likelihood that all images from the same digital camera will successfully be matched together into a single bin, rather than being sorted into separate bins. Furthermore, for each bin that contains more than one image after this phase, an aggregate fingerprint, i.e., a fingerprint of mass greater than 1, based on the multiple images in the bin, can be calculated. These aggregate fingerprints can be calculated iteratively, by repeatedly calculating new fingerprints by combining fingerprints for images or collections of images in bins that are merged together with other bins or individual images. By calculating aggregate fingerprints, the likelihood of correctly binning the images is increased, while the likelihood of sorting images from the same camera into separate bins is decreased.

The binning of images in the high-quality subset may be performed as follows. Take a first image, assign it to a bin, and then compare all the other images in the high-quality subset to the first image. This comparison may be a PCE. If the PCE exceeds a threshold for matching, then the image under test is added to that bin. The inventors have observed that a threshold value of 60 is one workable threshold, but others may be chosen according to desired design parameters. The procedure can then be applied recursively, taking a second image that failed to match the first image, assigning it to a new bin, and testing the remaining images and adding them to the new bin as appropriate. This can continue until no unbinned images remain.

The process continues at block 307, where the images from the low-quality subset are sorted into camera bins. The binning process here can be performed in the same way as in block 305. This may be seen as a continuation of the first binning process, where the low-quality subset of images, which initially had been held out of the binning process, are now added back into the set of images to be binned.

The rationale for splitting the images into a high-quality subset and a low-quality subset is that the low quality images are less likely to match other fingerprints from the same camera than is the case when comparing high quality images. One benefit to this approach is that it avoids repeatedly performing the computationally costly PCE for images that are less likely to match. The low-quality images are temporarily held out of the computation process, and are introduced only after the high quality images have been processed. These images that were less likely to match now can be tested against aggregate fingerprints resulting from the bins of high quality images, and because of the higher fingerprint mass, the low quality images will have a higher chance of matching successfully. Once the low-quality subset of images also have been sorted into bins, the binning process is complete.

Figure 4:
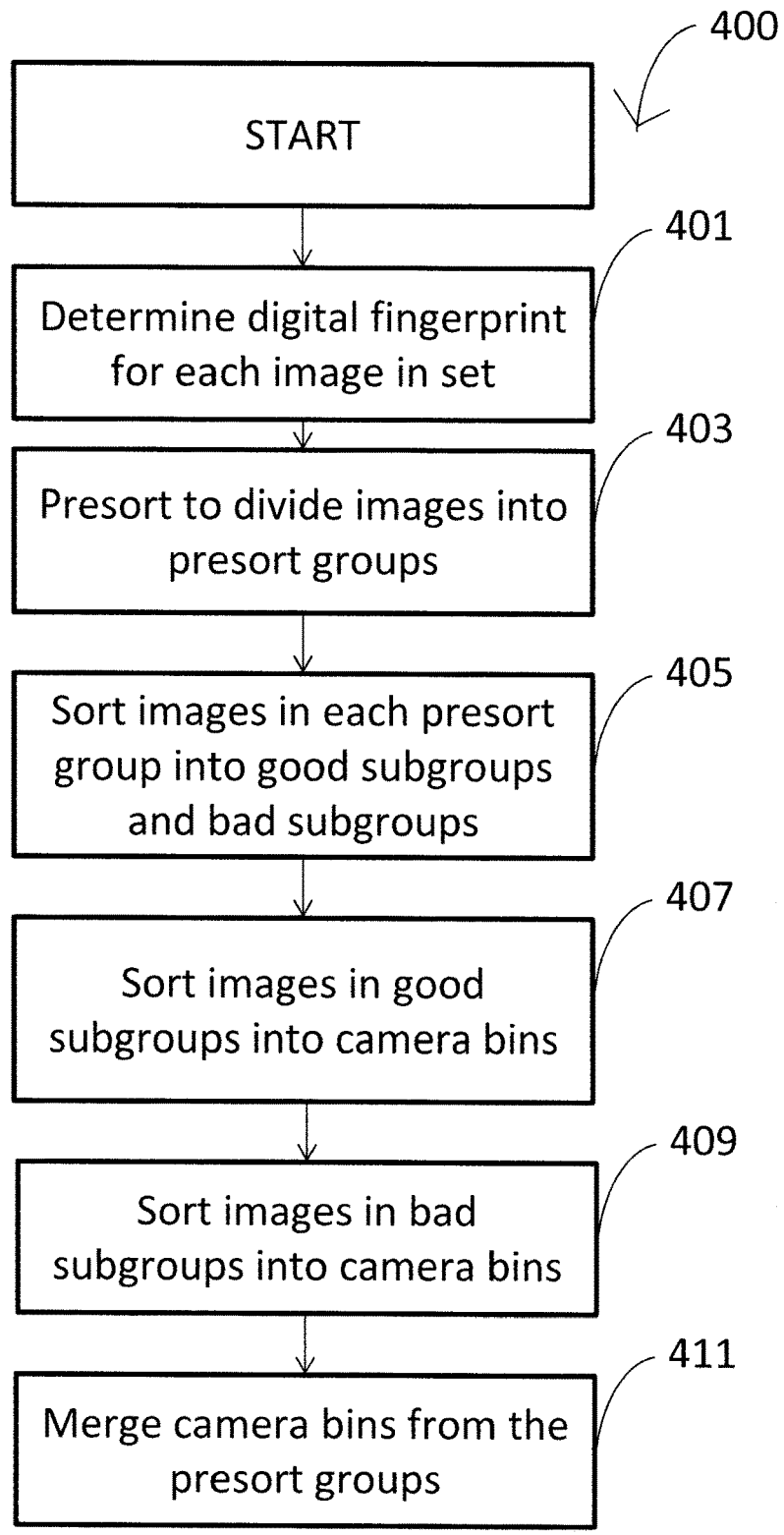
FIG. 4 is a flow chart describing a process for creating bins of digital images in accordance with an embodiment of the present invention.

A process 400 in accordance with an embodiment of the present invention is now described with reference to FIG. 4. The process 400 begins at block 401, where a digital fingerprint is determined for each image in a set of digital images. The digital fingerprints may be, for example, the PRNUs. The fingerprints may be determined according to methods known in the art, such as by applying a denoising filter to an image and subtracting the result from the original image. In other applications of digital camera fingerprinting, a fingerprint is often built up by combining results from multiple images known to come from a single camera. In the present case, however, the expectation is that all digital images in the set are of unknown provenance. Accordingly, we must begin by building a collection of fingerprints having fingerprint mass=1, i.e., only one image was used in forming the fingerprint. In the event that more information is available, the processes described herein can be modified for improved accuracy in accordance with techniques known in the art.

The process continues at block 403, where the images are presorted into presort sets. In some embodiments, image dimensions may be used as a basis for presorting. In some embodiments, EXIF information may be used as a basis for presorting. Dimension and EXIF information also may be combined as a basis for presorting. Presorting also may be performed based on other metadata, such as JPEG header information. Presorting also may be performed using image content. For example, images that appear to show the same or very similar scenes may be from the same camera. The presorting phase leverages whatever metadata and content may be available to put images that are a priori more likely to come from the same camera together in subsets. As a result, matches are found with fewer pair-wise tests. For example, the average camera user may not frequently change the dimensions of images taken with the camera, even if the camera allows for this. Accordingly, images with different dimensions may be less likely matches than images with identical dimensions. Similarly, EXIF data may show that images have similar geotagging, were taken close in time to each other, or may in some cases even have device ID numbers in the image metadata. All of this information can and should be leveraged as appropriate to execute the task efficiently, in the event it is available. Presorting, like the high/low-quality subsetting described below, can improve performance by simultaneously reducing total computation workload and increasing accuracy.

The process continues at block 405, where in each of the presort sets, the images are sorted into one of a high-quality subset associated with the presort set and a low-quality subset associated with the presort set. This is done by evaluating each image according to a quality metric. Some images are better suited for accurate source camera identification than others. In particular, images that are either saturated or under-exposed tend not to work well in comparative image analysis using PCEs. One quality metric that can be used is an extreme pixel factor (EPF), which may be calculated by counting a number of pixels in an image for which the image data have either very light or very dark values. In one example, very light may be defined as a brightness value of at least 250 (on a scale of 0-255, as with 8-bit brightness values), while very dark may be defined as a brightness value of at most 60. The EPF also may be normalized by dividing the sum of the very light and very dark pixels by the total number of pixels in the image, thereby allowing the EPF to be compared more meaningfully against other images having a different number of pixels. According to one embodiment, a threshold value may be defined, such that an EPF exceeding this threshold value causes the image to be sorted into the low-quality subset, while an EPF below this threshold causes the image to be sorted into the high-quality subset. The inventors have observed that an EPF less than 0.2 for both images in a pair of images is associated with high PCE scores, while EPFs of greater than 0.5 are associated with drastically lower PCE scores. The threshold value may be chosen as 0.2, 0.5, or some other appropriate value, based on the demands of a particular application.

The process continues at block 407, where the images in each of the high-quality subsets are sorted into camera bins. Because every image in a high-quality subset has a low EPF, there is an increased likelihood that all images from the same digital camera will successfully be matched together into a single bin, rather than being sorted into separate bins. Furthermore, for each bin that ends up holding multiple images after this phase, an aggregate fingerprint of mass greater than 1 can be calculated, which will increase the likelihood of correctly binning the lower quality images later on.

The binning of images in the high-quality subsets may be performed as follows. Take a first image, assign it to a bin, and then compare all the other images in that high-quality subset to the first image. This comparison may be a PCE. If the PCE exceeds a threshold for matching, then the image under test is added to that bin. A threshold of 60 has been identified as one workable threshold, but others may be chosen according to desired design parameters. The procedure can then be applied recursively, taking a second image that failed to match the first image, assigning it to a new bin, and testing the remaining images and adding them to the new bin as appropriate. This can continue until no unbinned images remain.

The process continues at block 409, where the images in each of the low-quality subsets are sorted into camera bins. The binning process here can be performed in the same way as in block 407. This may be seen as a continuation of the first binning process, where the low-quality subset of images, which initially had been held out of the binning process, is now added back into the set of images to be binned. The rationale for splitting the images into a high-quality subset and a low-quality subset is that the low quality images are less likely to match other fingerprints from the same camera than is the case when comparing high quality images. One benefit of this approach is that it avoids repeatedly performing the computationally costly PCE for images that are less likely to match anything. Furthermore, these images that were less likely to match anything can now be tested against aggregate fingerprints for the bins of high quality images, and because of the higher fingerprint mass, the low quality images will have a higher chance of matching successfully. Once the low-quality subsets of images also have been sorted into bins, this phase of the binning process is complete.

The process continues at block 411, where the camera bins from the presort sets are merged. Aggregate fingerprints may be calculated for each camera bin containing multiple images, and bins may be merged by finding matches between fingerprints for the bins, similarly to how individual images may be matched. However, aggregate fingerprints tend to be more accurate, as they contain more data, and thus matches (and failures to match) at this stage will have improved accuracy in relation to comparisons of individual images. The strategy followed here is thus to begin with individual image comparisons between the highest quality images that are presorted to present the highest likelihood of a match, and only then, once more reliable aggregate fingerprints have been built up, try to match the lower quality images. A failed match with a low quality image (from the same camera) at an early stage in the process could lead to that image being classified incorrectly in its own bin, whereas by only comparing it at this later stage, it is more likely to be matched successfully. Once the camera bins have all been merged to the extent possible, the binning process is complete.

Depending on the embodiment, certain acts, events, or functions of any of the methods described herein can be performed in a different sequence, can be added, merged, or left out altogether. Not all described acts or events are necessarily required for the practice of any claimed method. Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends on the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method or process described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, a DVD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

While the above description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that may not provide all of the features and benefits set forth herein, as some features can be used or practiced separately from others. The scope of the invention is indicated by the appended claims rather than the foregoing description. All changes which come within the meaning and range of equivalency of the claims are to be embraced within their scope.

We claim:

1. A computer-implemented method of using digital camera fingerprints to create, in a set of digital images generated by a plurality of digital cameras, bins of digital images, wherein each digital image in a particular bin was generated by the same digital camera as every other digital image in the same bin, the method comprising:
determining, for each digital image in the set of digital images, a digital fingerprint;
sorting each digital image into one of a high-quality subset and a low-quality subset by evaluating each image according to an extreme pixel factor, wherein the extreme pixel factor is determined based on at least one of a) a number of pixels in the image having a pixel intensity greater than a brightness threshold, and b) a number of pixels in the image having a pixel intensity less than a darkness threshold;
sorting each digital image in the high-quality subset into one of a plurality of bins, wherein in each bin the images were determined, based on the digital fingerprints of the images in the bin, to have been generated by a single digital camera associated with the bin; and
sorting each digital image in the low-quality subset into one of the plurality of bins, the sorting being performed based on the digital fingerprint of the digital image.

2. The method of claim 1, wherein each digital image comprises pixels, wherein sorting each digital image into one of a high-quality subset and a low-quality subset further comprises:
for each digital image, calculating the extreme pixel factor by:
determining a first number of pixels in the digital image having a pixel intensity greater than a brightness threshold;
determining a second number of pixels in the digital image having a pixel intensity less than a darkness threshold;
determining a third number of extreme pixels by adding the first number of pixels and the second number of pixels; and
determining the extreme pixel factor by dividing the third number of extreme pixels by a total number of pixels in the digital image; and
sorting the digital image into one of the high-quality subset and the low-quality subset based on the extreme pixel factor and a pixel factor threshold.

3. The method of claim 2, wherein the brightness threshold is at least 250 and the darkness threshold is at most 60.

4. The method of claim 2, wherein the pixel factor threshold is 0.2.

5. The method of claim 2, wherein the pixel factor threshold is 0.5.

6. The method of claim 1, wherein sorting each digital image into one of a high-quality subset and a low-quality subset further comprises ordering the digital images in the high-quality subset and the low-quality subset according to the extreme pixel factor, such that both a) sorting each digital image in the high-quality subset and b) sorting each digital image in the low-quality subset are performed by processing the digital images in an order according to the extreme pixel factor.

7. The method of claim 1, wherein sorting digital images into bins further comprises iteratively calculating aggregate digital fingerprints associated with the bins by combining digital fingerprints associated with the images already in the bins and digital fingerprints associated with the images being sorted into the bins, wherein sorting digital images into bins is performed further based on the aggregate digital fingerprints associated with the bins.

8. A computer-implemented method of using digital camera fingerprints to create, in a set of digital images generated by a plurality of digital cameras, bins of digital images, wherein each digital image in a particular bin was generated by the same digital camera as every other digital image in the same bin, the method comprising:
determining, for each digital image in the set of digital images, a digital fingerprint;

performing a presort operation to divide the set of digital images into presort sets;

for each presort set, sorting each digital image in the presort set into one of a high-quality subset and a low-quality subset;

for each high-quality subset in a presort set, sorting each digital image in the high-quality subset into one of a plurality of bins associated with the presort subset, wherein in each bin the images were determined, based on the digital fingerprints of the images in the bin, to have been generated by a single digital camera associated with the bin;

for each low-quality subset, sorting each digital image in the low-quality subset into one of the plurality of bins associated with the presort subset, the sorting being performed based on the digital fingerprint of the digital image; and performing a merge operation to combine the pluralities of bins associated with the presort sets into a single plurality of bins associated with the set of digital images, wherein each bin of the single plurality of bins contains only digital images determined to have been generated by a single digital camera associated with the bin.

9. The method of claim 8, wherein the presort operation comprises sorting based on dimensions of the digital images.

10. The method of claim 8, wherein the presort operation comprises sorting based on EXIF information of the digital images.

11. The method of claim 8, wherein each digital image comprises pixels, wherein sorting each digital image into one of a high-quality subset and a low-quality subset comprises:

for each digital image, calculating an extreme pixel factor by:
  determining a first number of pixels in the digital image having a pixel intensity greater than a brightness threshold;
  determining a second number of pixels in the digital image having a pixel intensity less than a darkness threshold;
  determining a third number of extreme pixels by adding the first number of pixels and the second number of pixels; and
  determining the extreme pixel factor by dividing the third number of extreme pixels by a total number of pixels in the digital image; and
sorting the digital image into one of the high-quality subset and the low-quality subset based on the extreme pixel factor and a pixel factor threshold.

12. The method of claim 11, wherein the brightness threshold is at least 250 and the darkness threshold is at most 60.

13. The method of claim 11, wherein the pixel factor threshold is 0.2.

14. The method of claim 11, wherein the pixel factor threshold is 0.5.

15. The method of claim 8, wherein sorting, each digital image into one of a high-quality subset and a low-quality subset further comprises ordering the digital images in the high-quality subset and the low-quality subset according to the extreme pixel factor, such that both a) sorting each digital image in the high-quality subset and b) sorting each digital image in the low-quality subset are performed by processing the digital images in an order according to the extreme pixel factor.

16. A non-transitory computer-readable medium having computer processor-executable instructions stored thereon, wherein execution of the instructions by a computer processor causes the computer processor to perform a method of creating, in a set of digital images generated by a plurality of digital cameras, bins of digital images, the method comprising:

determining, for each digital image in the set of digital images, a digital fingerprint;

performing a presort operation to divide the set of digital images into presort sets;

for each presort set, sorting each digital image in the presort set into one of a high-quality subset and a low-quality subset;

for each high-quality subset in a presort set, sorting each digital image in the high-quality subset into one of a plurality of bins associated with the presort subset, wherein in each bin the images were determined, based on the digital fingerprints of the images in the bin, to have been generated by a single digital camera associated with the bin;

for each low-quality subset, sorting each digital image in the low-quality subset into one of the plurality of bins associated with the presort subset, the sorting being performed based on the digital fingerprint of the digital image; and performing a merge operation to combine the pluralities of bins associated with the presort sets into a single plurality of bins associated with the set of digital images, wherein each bin of the single plurality of bins contains only digital images determined to have been generated by a single digital camera associated with the bin.

17. The computer-readable medium of claim 16, wherein the presort operation comprises sorting based on dimensions of the digital images.

18. The computer-readable medium of claim 16, wherein each digital image comprises pixels, wherein sorting each digital image into one of a high-quality subset and a low-quality subset comprises:

for each digital image, calculating an extreme pixel factor by:
  determining a first number of pixels in the digital image having a pixel intensity greater than a brightness threshold;
  determining a second number of pixels in the digital image having a pixel intensity less than a darkness threshold;
  determining a third number of extreme pixels by adding the first number of pixels and the second number of pixels; and
  determining the extreme pixel factor by dividing the third number of extreme pixels by a total number of pixels in the digital image; and
sorting the digital image into one of the high-quality subset and the low-quality subset based on the extreme pixel factor and a pixel factor threshold.

19. The computer-readable medium of claim 18, wherein the brightness threshold is at least 250 and the darkness threshold is at most 60.

20. The computer-readable medium of claim 16, wherein sorting each digital image into one of a high-quality subset and a low-quality subset further comprises ordering the digital images in the high-quality subset and the low-quality subset according to the extreme pixel factor, such that both a) sorting each digital image in the high-quality subset and b) sorting each digital image in the low-quality subset are performed by processing the digital images in an order according to the extreme pixel factor.

* * * * *